3,245,771
PROCESS FOR DISTORTIONLESS SHAPING OF
GLASS BANDS TO GLASS PROFILES
Fridolin Jamnik and Adolf Pelzl, Vienna, Austria, assignors to Mossbrunner Glasfabriks-Aktiengesellschaft, Vienna, Austria
Filed Oct. 24, 1961, Ser. No. 147,327
Claims priority, application Austria, Nov. 10, 1960,
A 8,389/60
2 Claims. (Cl. 65—106)

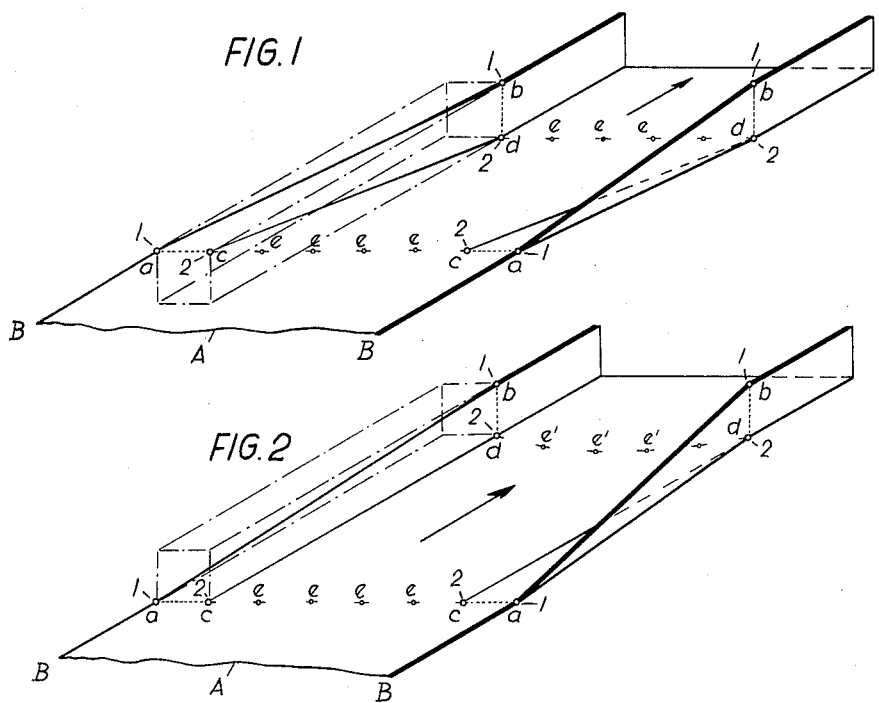
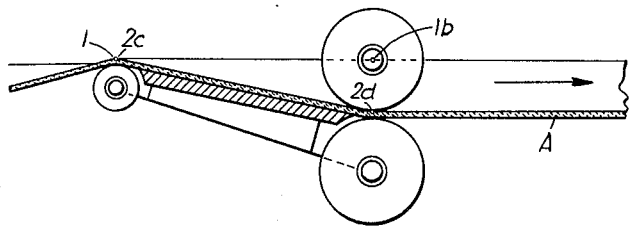

Processes are known according to which continuously produced glass bands may be shaped following the production process to form, e.g., corrugated glass, glass profiles or grooves and tubes.

However, this process has the disadvantages that the glass bands produced are subject to irreversible variations of length, width or thickness during the shaping operation. In the known processes of shaping rolled or extruded/drawn/reinforced and not reinforced flat glass bands to form profiled elements not all the points of the band on an imagined straight line in the sectional plane crosswise to the longitudinal axis describe the same way during the same period of time. Consequently, the glass has not the same advance speed at all the points in this area.

During shaping at temperatures close to the softening point variations of thickness, width and length result thereof, which cause considerable permanent residual stresses that cannot be balanced by normal cooling processes. Such distortions are particularly marked with reinforcement nettings.

The subject invention aims at preventing the aforesaid inconveniences with glass profiles.

According to this invention the problem of preventing mass displacements and—in connection therewith—distortions and/or compressive strains in shaping rolled or extruded/drawn/reinforced or not reinforced flat glass bands to form building profiles or elements is solved in the way that by a suitable selection of the inclination of the guiding plane of the glass band during the shaping operation over specifically arranged shaping means all the points $e$ (FIG. 1) of the band on a straight line in the sectional plane crosswise to the longitudinal axis describe the same way within the same period of time and consequently have the same advance speed.

The object of the invention is illustrated in the drawings by way of example. The respective drawings show:

FIG. 1, a schematic view of the course of the shaping process according to the invention.

FIG. 2, the so far used shaping process, on hand of an example.

FIG. 3, an enlarged detail of the process according to the invention.

According to the so far used processes, e.g., the bottom part of the profiles A was advanced in one plane and the sides bent upwards or downwards. According to this process point 1 in FIG. 2 describes a spaced diagonal from $a$ to $b$, while point 2 describes the way of the imagined lateral edge $c$–$d$.

The distance $a$–$b$ is longer than the distance $c$–$d$. Considering that naturally the borders B are colder than the inner parts of the glass band, elongations are possible still, yet by no means compression around point $b$ (FIG. 2). These elongations take effect in the softer parts of the profile bottom and occasion unwanted distorstions as illustrated in FIG. 2 by the points $e'$ forming a curved line in the profile web between the points $d$—$d$. This is particularly obvious with reinforcement nettings.

In the process according to the invention, as illustrated by the FIGS. 1 and 3, the glass band is fed to the shaping means on a level with the top edges of the future profile sides to be shaped. By this method point 1 describes a surface diagonal from $a$ to $b$, while point 2 describes the same surface diagonal from $c$ to $d$, as illustrated in FIG. 1.

By way of further explanation it will be apparent from the drawings that, in the practice of this invention, an edge portion of the band is gradually bent inwardly and transversely to the plane of the band while, at the same time, the remainder of the band is guided in a plane inclined to the original plane of advance at such an angle (as illustrated in FIG. 3) that the distance between a first plane disposed normal to the feeidng direction and passing through the points A and C in FIG. 1 and a second plane disposed normal to the feeding direction and passing through the points B and D in FIG. 1 will be the same when measured along the edge A–B as the distance C–D measured along the base of the web. In other words, according to applicants' novel method, during the rolling of the channel, the material from which the flange is formed is displaced in feeding direction through the same distance as the material of the flat band so that, during the forming of the channel, no longitudinal stresses are imparted to the material of the band.

The aforesaid measures permit to obtain distortion-free shapings of profiled bands. This process may be used for optional shapings.

What is claimed as new and desired to be secured by Letters Patent is:

1. In a process of rolling channels from flat glass bands, comprising the steps of feeding a flat glass band in plastic state in one direction; and gradually bending at least one edge portion of the flat glass band inwardly and transversely to the plane of the band so as to form at least one flange along one side of the remainder of the band, while simultaneously guiding the remainder of the band in a plane inclined to the free edge of the flange at such an angle so that the distance between two planes normal to said feeding direction measured along the free edge of said flange is equal to the distance between said two planes measured in feeding direction along the surface of the remainder of said flat band.

2. In a process of rolling channels from flat glass bands, comprising the steps of feeding a flat glass band in plastic state in one direction; gradually bending at least one edge portion of the flat glass band inwardly and transversely to the plane of the band so as to form at least one flange along one side of the remainder of the band, while simultaneously guiding the remainder of the band in a plane inclined to the free edge of the flange at such an angle that the distance between two planes normal to said feeding direction measured along the free edge of said flange is equal to the distance between two planes measured in feeding direction along the surface of the remainder of said flat band until said flange has a desired height; and subsequently guiding the remainder of said band in a plane normal to said two planes and parallel to said free edge of said flange so as to obtain a rolled glass channel free of internal stresses.

References Cited by the Examiner

UNITED STATES PATENTS

| 2,116,297 | 5/1938 | Aurien | 65—55 |
| 2,240,349 | 4/1941 | Preston | 65—107 |
| 2,586,481 | 2/1952 | Rooksby et al. | 65—107 |

FOREIGN PATENTS

| 1,094,435 | 12/1954 | France. |
| 1,163,547 | 4/1958 | France. |
| 1,063,347 | 8/1959 | Germany. |

DONALL H. SYLVESTER, *Primary Examiner.*